United States Patent [19]

Fukumoto

[11] Patent Number: 4,646,701

[45] Date of Patent: Mar. 3, 1987

[54] EVAPORATION FUEL PROCESSING APPARATUS FOR TWO-WHEEL VEHICLE

[75] Inventor: Tsunenori Fukumoto, Saitama, Japan

[73] Assignee: Honda Giken Kogyo Kabushiki Kaisha, Japan

[21] Appl. No.: 685,954

[22] Filed: Dec. 24, 1984

Related U.S. Application Data

[63] Continuation of Ser. No. 461,710, Jan. 28, 1983, abandoned.

[30] Foreign Application Priority Data

Jan. 30, 1982 [JP] Japan ............................ 57-12257[U]

[51] Int. Cl.[4] ...................... F02M 25/08; B01D 53/04

[52] U.S. Cl. ...................................... 123/519; 55/387; 55/420; 123/516; 270/205; 270/374

[58] Field of Search ............... 123/516, 518, 519, 520, 123/521; 55/417, 420, 387, 316; 220/373, 374, 205, 203, DIG. 33

[56] References Cited

U.S. PATENT DOCUMENTS

| | | | |
|---|---|---|---|
| 3,302,658 | 2/1967 | Frees | 123/516 |
| 3,703,165 | 11/1972 | Hansen | 123/518 |
| 3,977,379 | 8/1976 | Weissenbach | 123/518 |
| 4,000,727 | 1/1977 | Walker | 123/519 |
| 4,165,816 | 8/1979 | Tupper | 220/373 |
| 4,312,649 | 1/1982 | Fujii et al. | 220/DIG. 33 |
| 4,362,130 | 12/1982 | Robinson | 123/518 |

FOREIGN PATENT DOCUMENTS

| | | | |
|---|---|---|---|
| 161952 | 12/1980 | Japan | 123/519 |
| 44444 | 4/1981 | Japan | 123/518 |
| 151253 | 11/1981 | Japan | 123/519 |

*Primary Examiner*—Tony M. Argenbright

*Attorney, Agent, or Firm*—Sughrue, Mion, Zinn, Macpeak, and Seas

[57] ABSTRACT

An evaporative fuel processing apparatus for a two-wheel vehicle provided with a separator for separating an evaporative fuel from a fuel tank into a gas and a liquid. The apparatus comprises a bent conduit in fluid communication with the separator having opposite ends, one of which is opened near a tank cap mounting portion at an upper portion of said fuel tank and the other passing through the fuel tank to communicate with an absorber floor. A tank cap may be directly coupled with the separator in a second embodiment. A roll-over valve may also be employed. A gas-liquid separator may be integrally formed in the cap.

6 Claims, 13 Drawing Figures

EVAPORATION FUEL PROCESSING APPARATUS FOR TWO-WHEEL VEHICLE

This is a continuation of application Ser. No. 461,710, filed Jan. 28, 1983, now abandoned.

BACKGROUND OF THE INVENTION

The present invention relates to a technique for handling an evaporation fuel gas in a two-wheel vehicle.

There has been proposed in the art a technique employing an evaporative emission loss control system (hereinafter referred to as the "evapo-control system") in which a two-wheel vehicle, evaporative fuel in a fuel tank is absorbed in active carbon or charcoal to be effectively used as a fuel. In the conventional system, a gas-liquid separator is provided at an upper portion within a fuel tank and a bent conduit is connected to the separator to prevent fresh fuel from directly flowing into a charcoal canister absorber. If the gas-liquid separator is disposed within the fuel tank, however, there is a risk that the fresh fuel may flow into the charcoal canister when the liquid surface is displaced due to the temperature rising in the fully filled state of the tank and therefore it is necessary to suppress the quantity of fuel by using a level plate (a fuel filler metal described herein). Given the limited tank size in a two-wheeled vehicle, limitations on fuel quantity are serious drawbacks.

SUMMARY OF THE INVENTION

The present invention is intended to improve the evapo-control system of the prior art. Accordingly, an object of the invention is to provide an evaporative fuel processing apparatus in which it is not necessary to suppress the quantity of fuel supply into a fuel tank even if a gas-liquid separator is disposed in the fuel tank.

In accordance with this invention a system employs an evaporator coupled to the uppermost portion of the fuel tank with a vent conduit. If the tank cap is equipped with a breather assembly or separator, the evaporator is directly coupled thereto. The separator may be integral with the cap. To prevent spillage of liquid into the evaporator, a roll-over valve mechanism may be employed.

The configuration, functions and effects of the present invention will be described in greater detail with respect to embodiments thereof by referring to the drawings attached herewith.

DESCRIPTION OF THE PREFERRED EMBODIMENTS

Figure 1:
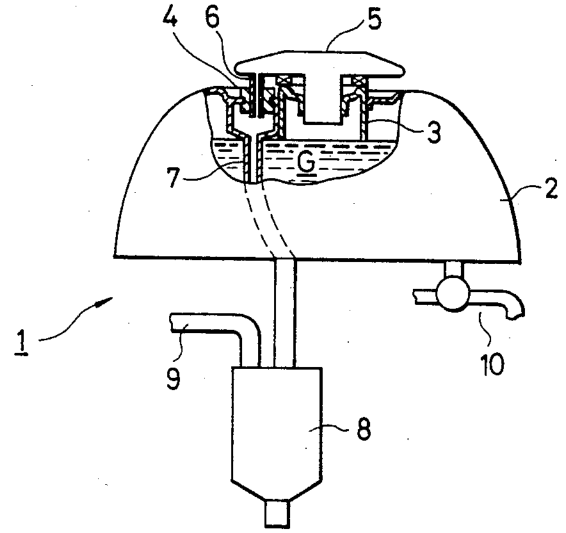
FIG. 1 is a partially broken schematic front view of the evaporative fuel processing apparatus according to a first embodiment of the present invention.

Referring now to FIG. 1, an evapo-control system 1 of this invention generally comprises a tank cap 5 having a gas-liquid separator function and provided with a breathing pipe 6, a charcoal canister 8 provided separately from a fuel tank 2, a bent conduit 7 disposed through the tank 2 and having an opening at an upper portion of the tank 2, and a purge line 9 connected between the charcoal canister 8 and an engine intake manifold (not shown).

Figure 13:
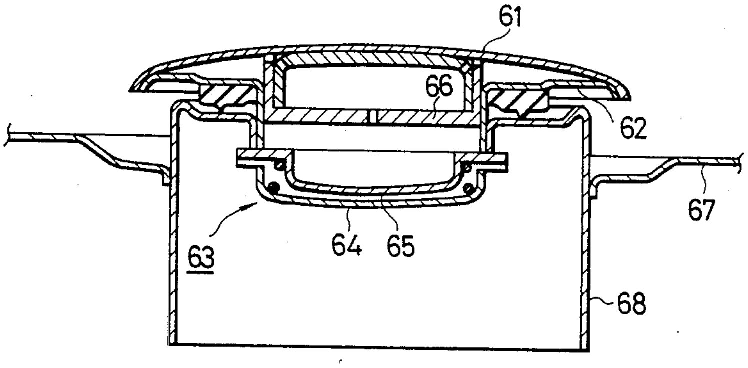
FIG. 13 PRIOR ART
FIG. 13 is a longitudinal cross-section of a conventional tank cap.

The tank cap 5 additionally has a breathing pipe 6 in the tank cap. A conventional gas cap, for purposes of comparison has structure as shown in FIG. 13. That is, the conventional tank cap 61 is provided with a gas-liquid separator 63 having buffer plates 64, 65, and 66 so that, when the tank cap 61 is tightened to a fuel filler metal portion 68, the inner space of the tank may communicate with external air through respective breathing openings formed in the buffer plates 64, 65, and 66 and a breathing opening 62 formed in the tank cap body at the lower portion thereof.

The tank cap 5 in the first preferred embodiment of this invention may be obtained by modifying a conventional cap to provide the breathing pipe 6 in the breathing opening 62 of the tank cap 61 having such a structure as mentioned above. In the fuel tank 2, the opening of the bent conduit 7 is provided adjacent to the fuel filler metal 3 and a breathing pipe seal rubber 4 is disposed at the opening of the bent conduit 7. In FIG. 1, the reference number 10 denotes a fuel cock.

Figure 2:
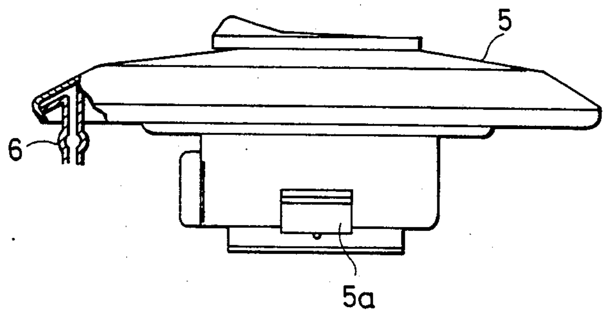
FIG. 2 is a partially broken front view illustrating the tank cap of FIG. 1 apparatus.

If the tank cap 5 is tightened to the fuel filler metal 3 by engagement by using electric pawls 5*a* shown in FIG. 2, the breathing pipe 6 communicates with the opening portion of the bent conduit 7 through the breathing pipe seal rubber 4 (FIG. 1) so that a closed fuel system is defined.

In the thus arranged evapo-control system, the evaporative gas component of the fuel G contained in the fuel tank 2 is fed to the charcoal canister 8 through the gas-liquid separator of the tank cap 5, the breathing pipe 6 and the bent conduit 7 and absorbed into the active carbon or charcoal in the charcoal canister 8. The absorbed gas is sucked into the intake manifold side of the engine through purge line 9 during running thereof.

Fresh liquid fuel is prevented from flowing into the breathing pipe 6 because of the function of the gas-liquid separator provided in the tank cap 5. This separation occurs even if fuel oil is present in the fuel tank so that the fuel oil surface directly attaches the tank cap 5 when the vehicle is inclined during running thereof.

In this first preferred embodiment, as described above, since the bent pipe 7 is connected to the tank cap 5 having the gas-liquid separator, it is not necessary to provide a gas-liquid separator in the upper space within the fuel tank 2. Thus, this structure which has been so far provided in the conventional system is eliminated. The effective inner space of the fuel tank is therefore increased.

The change in structure for this purpose may be made to a prior art cap such that in the tank cap 5, only the breathing pipe 6 is provided to the conventionally used tank cap 61. In the fuel tank 2, only the opening portion of the bent conduit 7 is formed and the breathing pipe seal rubber 4 is provided at the opening portion of the bent conduit 7. Thus, the modified structure does not change the overall appearance of the fuel tank 2.

Figure 6:
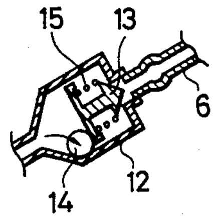
FIG. 6 is a cross-section of a main portion of FIG. 4 embodiment for explaining the operation of the second preferred embodiment.

Further, by providing a roll-over valve in the opening portion of the bent conduit 7, it is made possible to prevent the fresh fuel from flowing into the bent conduit side even if the vehicle is inclined beyond normal limits. Such an assembly is shown in FIGS. 4 and 6.

Figure 4:
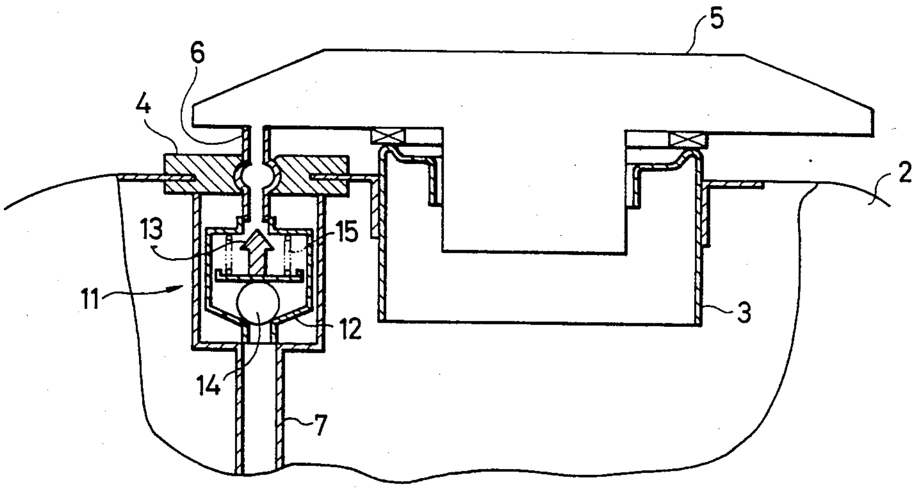
FIG. 4 is a partially broken front view illustrating a portion of the evaporative fuel processing apparatus according to a second preferred embodiment of the present invention.
Figure 5:
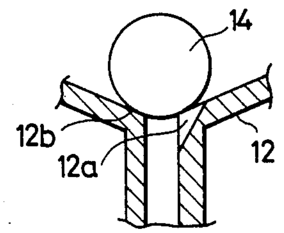
FIG. 5 is an enlarged cross-section of a portion of FIG. 4 embodiment.

As shown in FIG. 4, a roll-over valve 11 utilizes a valve 13 provided above a ball 14 that is normally downward urged by a compression coiled spring 15. A seat surface 12*b* shown in FIG. 5 of a body 12 is blocked but the bent conduit 7 may communicate with the breather 6 through a slot 12*a* formed in the seat surface 12*b*. In case the two-wheel vehicle is excessively inclined as shown in FIG. 6, the valve 13 is displaced by the ball 14 to overcome spring action of spring 15 so that the breather inlet portion is blocked by the valve 13. Accordingly, the fresh fuel cannot flow into the bent conduit 7 from the breather when the vehicle inclines.

Figure 7:
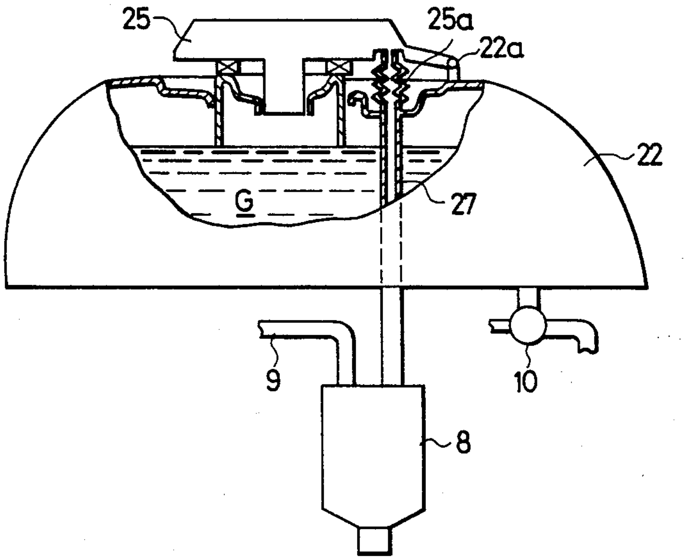
FIG. 7 is a partially broken schematic front view of the evaporative fuel processing apparatus according to a third preferred embodiment of the present invention.

Further preferred embodiments will be described by referring first to FIG. 7. This third embodiment is preferred in the case of a hinged tank cap. A tank cap 25 has a structure similar to the above-mentioned tank cap 5 and is attached to a fuel tank 22 by a hinge 22*a*. The hinging action allows the cap to open and close about the hinge as opposed to unscrewing or snap action. A flexible tube 25*a* is connected between a breathing opening of the tank cap 25 and a bent conduit 27 as illustrated in FIG. 7. Therefore, the tank cap 25 and the bent conduit 27 are always connected regardless the state of the tank cap 25, whether it is opened or closed and no sealing is required.

Figure 8:
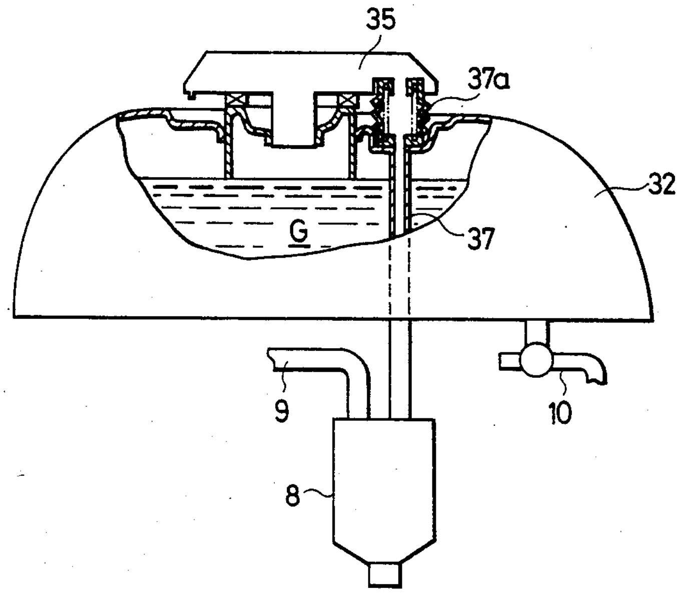
FIG. 8 is a partially broken schematic front view of the evaporative fuel processing apparatus according to a fourth preferred embodiment of the present invention.
Figure 9:
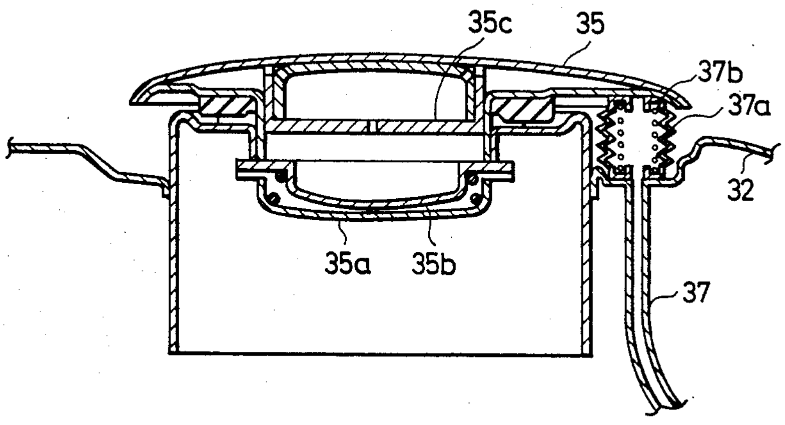
FIG. 9 is an enlarged cross-section of a portion of FIG. 8 embodiment.

In the case of a screw on tank cap shown in FIGS. 8 and 9, a flexible tube 37*a* is provided at an opening portion of a bent conduit 37 at the fuel tank 32. By action of an internally provided spring 37*b*, the tube 37*a* abuts on a portion of a tank cap 35. The tank cap is provided with a gas-liquid separator comprising buffle plates 35*a*, 35*b* and 35*c*, to seal a breathing opening of the tank cap and to provide communication between the tank cap side and the bent conduit with each other. In this manner, the invention can be applied to a screw-tightened tank cap. As shown in FIG. 8, this modification forming the fourth preferred embodiment applies to the cap forming the first preferred embodiment of this invention as well as to a modified prior art cap shown in FIG. 9.

Figure 3:
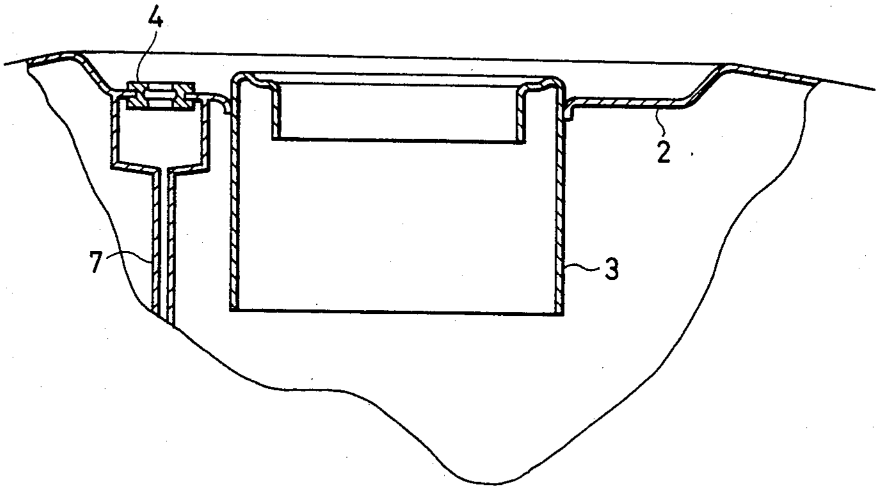
FIG. 3 is a partially broken front view illustrating a main portion of the fuel tank of FIG. 1.
Figure 10:
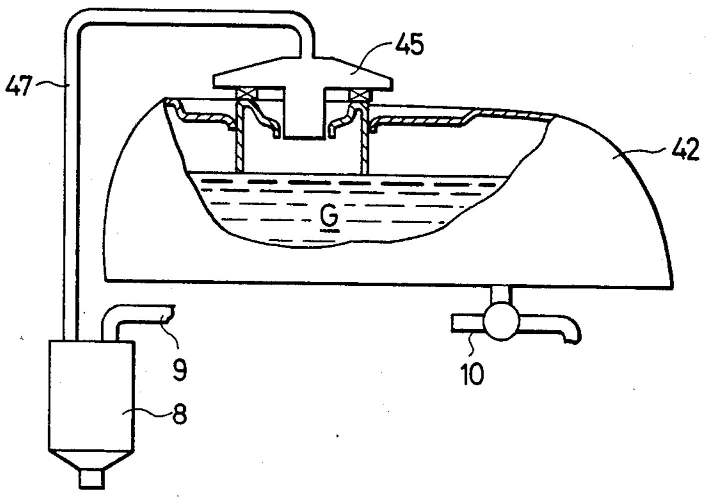
FIG. 10 is a partially broken schematic front view of the evaporative fuel processing apparatus according to a fifth preferred embodiment of the present invention.

In some situations, a tank cap has bent pipe directly connected to the charcoal canister. This is shown in the fifth and sixth preferred embodiments of FIGS. 10 and 11. An opening of a breathing line is formed in the upper surface of a tank cap 45 having a structure similar to the tank cap as already shown in FIGS. 1–3 and a flexible bent conduit 47 is connected to the tank cap 45 to seal the opening of the breathing line. The bent conduit 47 is disposed outside a fuel tank 42 thereby differing from the first mentioned embodiment. In this configuration, since the end opening of the bent conduit 47 is placed at a higher level than the liquid surface of the fuel G, and because of the gas-liquid separating function, the fresh fuel cannot flow into the bent pipe 47.

Figure 11:
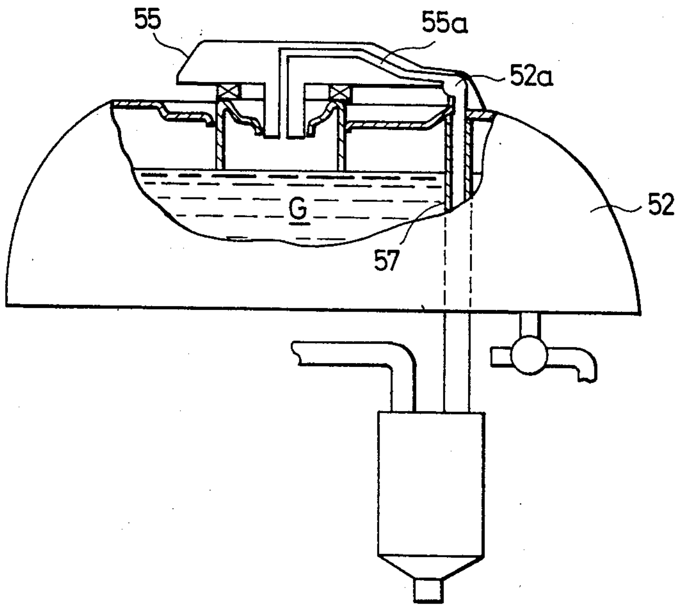
FIG. 11 is a partially broken schematic front view of the evaporative fuel processing apparatus according to a sixth preferred embodiment of the present invention.
Figure 12:
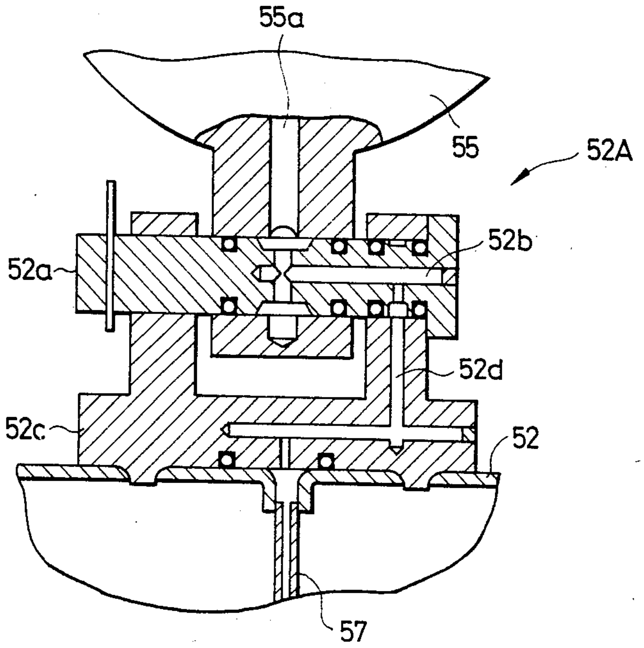
FIG. 12 is an enlarged cross-section of a portion of FIG. 11 embodiment.

In the case of a hinged tank cap shown in FIG. 11, a tank cap 55 is connected to a fuel tank 52 with a hinge 52A and a breathing line 55*a* disposed in the tank cap 55 is connected to a bent conduit 57 through the hinge 52A. That is, as shown in the cutaway view of FIG. 12, a path 52*b* is formed in the inside of a rotary shaft 52*a* of the hinge 52A and communicates with a path 52*d* formed in a member 52*c*. A breathing line 55*a* and a bent conduit 57 communicates with the paths 52*b* and 52*d* respectively. Thus, the tank cap side and the bent conduit side are always connected to each other regardless the state of the tank cap 55, whether it is opened or closed.

As apparent from the preferred embodiments herein, according to the present invention, in an evaporative fuel processing apparatus for a two-wheel vehicle provided with a separator for separating an evaporative fuel from a fuel tank into gas and liquid, there is provided a bent pipe having opposite ends one of which is open near a tank cap mounting portion at an upper portion of the fuel tank and the other passing through the fuel tank and communicated with an absorber floor. A tank cap is integrally formed with the separator, and the separator and the bent pipe are arranged to communicate with each other, so that it is not necessary to dispose the gas-liquid separator in an upper space in the fuel tank. This differs from the conventional arrangement and increases the capacity of the fuel tank because the inner space of the fuel tank and the bent pipe communicate with each other through the tank cap which is provided with the gas-liquid separator.

Further, there is an additional advantage in that there is no change in the appearance of the tank structure.

What is claimed is:

1. An evaporative fuel processing system for a two-wheel vehicle comprising; a fuel tank having a cap and a metallic filling port; said cap located at the top of said tank above an upper portion thereof and positioned in said metallic fuel filling port; a separator in said cap for separating evaporative fuel received from said fuel tank into a gas and a liquid; a conduit, one upper end of said conduit open in said tank in fluid communication with said cap above said upper portion of said fuel tank and separated from said metallic fuel filling port and other end of said conduit coupled to an external absorber and a portion of said conduit disposed outside said fuel tank; and means to secure said cap to said tank, comprising a hinge coupling said cap to said tank for pivotal movement of said cap, and a flexible tube coupling said conduit to said cap.

2. The evaporative fuel processing system of claim 1 further comprising a breather pipe in said cap in fluid communication with said upper end of said conduit.

3. The evaporative fuel processing system of claim 2 further comprising roll-over valve means to seal said breather when said vehicle inclines beyond a predetermined point.

4. The evaporative fuel processing system of claim 3 wherein said roll-over valve means comprises a first valve member biased to keep said breather pipe in open fluid communication with said conduit and a second valve member responsive to inclination of said two-wheel vehicle to overcome said bias and move said first valve member into a sealing position when said vehicle inclines beyond a predetermined point.

5. The evaporative fuel processing system of claim 1 wherein said conduit is in fluid communication with said cap at said upper portion of the fuel tank and isolated from said metallic filling port which is sealed by said cap.

6. The evaporative fuel processing system of claim 2 wherein said breather is in axial alignment with said conduit.

* * * * *